Sept. 24, 1940.　　　　　H. BAADE　　　　　2,215,602
BRAKING SYSTEM
Filed Jan. 31, 1938　　　2 Sheets-Sheet 1

INVENTOR.
HENRY BAADE
By Jerome R. Cox
ATTORNEY.

Sept. 24, 1940.　　　H. BAADE　　　2,215,602
BRAKING SYSTEM
Filed Jan. 31, 1938　　　2 Sheets-Sheet 2

INVENTOR.
HENRY BAADE
BY Jerome R. Cox.
ATTORNEY.

REISSUED

Patented Sept. 24, 1940

2,215,602

UNITED STATES PATENT OFFICE 2,215,602

BRAKING SYSTEM

Henry Baade, Detroit, Mich., assignor to Bendix Products Corporation, South Bend, Ind., a corporation of Indiana Application January 31, 1938, Serial No. 187,905

13 Claims. (Cl. 188—3)

This invention relates to brakes and more particularly to trailer brakes operated by power.

An object of the invention is to provide means for operating trailer power brakes from a touring vehicle equipped with hydraulic brakes.

Another object is to provide means for controlling vacuum-suspended vacuum brake cylinders on a trailer vehicle from a touring vehicle having hydraulically operated brakes.

Still another object is to provide means for controlling atmospheric-suspended vacuum brake cylinders on a trailer vehicle having hydraulically operated brakes.

Another object is to provide means for controlling a vacuum brake cylinder in accordance with the pressure in a hydraulic brake system.

Yet another object is to provide means for controlling a differential air pressure cylinder by means of the hydraulic pressure in a hydraulic brake system.

I prefer to accomplish these objects by providing, generally on the touring or tractor vehicle, a control valve adapted to control the differential air pressures applied to a power cylinder for operating the trailer brakes positioned on the trailer vehicle, which valve is operated by means of a hydraulic motor cylinder operatively connected with the pressure lines of the hydraulic brake system of the tractor vehicle.

I prefer to provide a valve having pressure responsive means responsive to the controlled pressure in the power brake cylinder, which pressure responsive means reacts against the force of the hydraulic actuating cylinder so that the hydraulic pressure and the controlled pressure are substantially proportionate.

The above and other objects and desirable particular constructions and arrangements of parts will be apparent upon reference to the following detailed description of several embodiments of my invention shown in the accompanying drawings in which.

Figure 1:
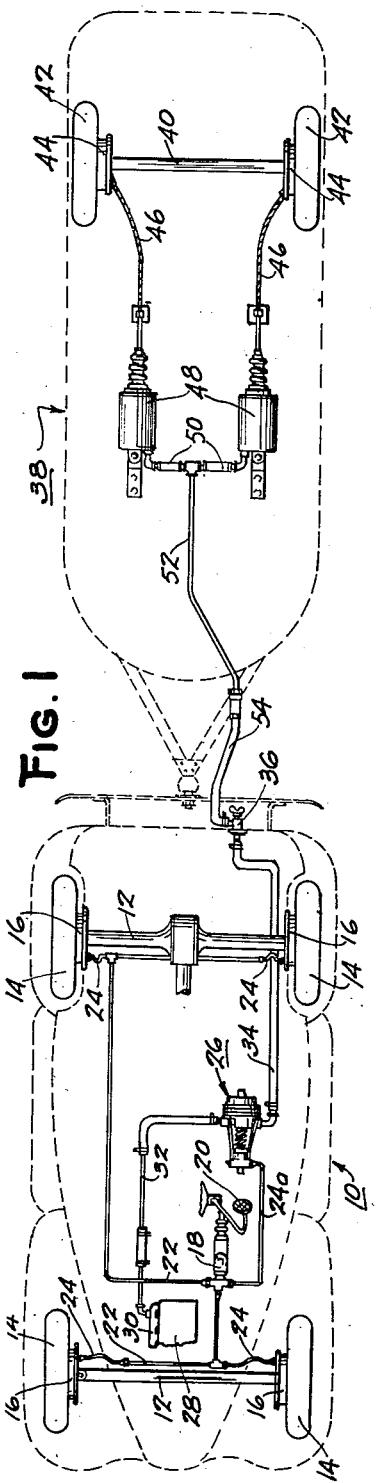
Figure 1 is a diagrammatic plan view of tractor and trailer vehicles equipped according to my invention, and in which the brakes of the trailer are actuated by atmospheric-suspended cylinders.

Figure 1 shows a touring vehicle, here illustrated as an automobile 10, having axles 12 on which are mounted wheels 14 and brakes 16. The automobile is provided with a hydraulic master cylinder 18 operated by a foot pedal 20 or corresponding device. Fluid from the master cylinder 18 is delivered by copper tubing 22 or the like and flexible hose 24 to the brakes 16 to operate them. Another tube 24a delivers fluid from the master cylinder to my novel control valve 26. The automobile 10 has the usual internal combustion engine 28 with an induction pipe or intake manifold 30 which provides a source of vacuum. A conduit 32 connects this source of vacuum to my novel valve 26 and the controlled pressure from my novel valve is conducted to the rear of the vehicle by a conduit 34 terminating at a cut-off valve 36.

Figure 3:
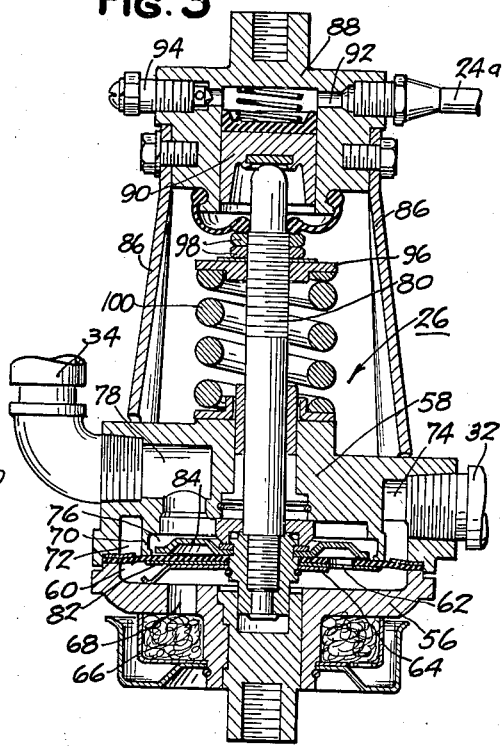
Figure 3 is a longitudinal sectional view of the valve of Figure 1.

Attached to the rear of the automobile 10 is a towed vehicle or trailer 38 having an axle 40 on which are mounted wheels 42 and brakes 44. The brakes may be operated by Bowden cables 46, or the like, connected to atmospheric-suspended vacuum cylinders 48 secured to the structure of the trailer. The cylinders 48 have vacuum hoses 50 connected thereto leading to a common hose 52 extending forwardly of the vehicle and connected by a flexible hose 54 to the tractor vehicle controlled pressure conduit 34 through the cut-off valve 36, which, of course, is opened when the trailer is attached. My novel valve 26 is shown in detail in Figure 3. It comprises a pair of casing shells 56 and 58 having clamped between them a diaphragm 60, having an annular ring of perforations 62. The lower shell 56 and diaphragm 60 form an air chamber 64 communicating with an air cleaner 66 by means of a port 68. The diaphragm 60 and upper casing shell 58 form two chambers separated at times by an annular wall 70. The outer chamber 72 is a vacuum chamber communicating with the conduit 32 by a port 74 and the inner chamber 76 is a controlled pressure chamber communicating with the conduit 34 by a port 78.

A plunger 80 is secured to the center of the diaphragm 60 and extends through suitable packings out of the casing shell 58. Secured to the plunger on opposite sides of the diaphragm are a pair of valve discs 82 and 84. The disc 82 is on the air chamber side, has perforations corresponding to the perforations 62 of the diaphragm 60, and is of such diameter that, when the plunger 80 is moved upwardly this disc presses the diaphragm against the edge of the annular wall 70 separating the two chambers 72 and 76. The other disc 84 is on the opposite side of the diaphragm, is not perforated, is provided with an annular edge adapted to engage and seal against the diaphragm radially outwardly of the perforations 62, and is of slightly less diameter 84 than the annular wall 70. When the plunger 80 is raised to its extreme position, the annular diaphragm engaging edge of the disc 84 is lifted free of the diaphragm.

A pair of brackets 86 secured to the casing members carry a hydraulic cylinder 88 having a piston 90 engaging the plunger 80. The cylinder is provided with an inlet port 92 receiving the conduit 24a, and the usual bleed screw 94. Compressed between a washer 96 abutting against adjusting nuts 98 threaded on the plunger 80, and the outer surface of the casing shell 58 is a coil spring 100 which normally urges the plunger upwardly.

In operation it will be noted that with the plunger 80 in its normal position as determined by the spring 100, air at atmospheric pressure enters the air chamber 64 from the air cleaner 66 through the port 68, and passes from the air chamber 64 into the controlled pressure chamber 84 through the perforations 62 in the diaphragm 60 and under the edge of the valve disc 84. Consequently the pressure in the controlled pressure conduit 34, the flexible hose 54, the conduits 50 and 52 and the cylinders 48 is atmospheric and the trailer brakes 44 are released.

Now when the driver of the automobile 10 applies the brakes 14 of the automobile by pressing on the foot pedal 20, hydraulic pressure is created in the line 24a which acts on the piston 90 to force the plunger downwardly when the force on the piston exceeds the force of the spring 100. When this occurs the valve disc 84 seats on the diaphragm 60, closing communication between the air chamber 64 and the controlled pressure chamber 76 through the ports 62, then the diaphragm 60 is lifted from the edge of the annular wall 70 permitting communication between the vacuum chamber 72. This communication with the vacuum chamber withdraws air from the controlled pressure chamber 76, the conduit 34, hose 54, conduits 50 and 52, and the cylinders 48, thereby applying the trailer brakes 44.

The vacuum in chamber 76 reacts on the diaphragm 60 in opposition to the hydraulic pressure on the piston 90 and, if this pressure is not too great (i. e., if the brakes are applied lightly) the valve will move back to a lapped position wherein the diaphragm is in contact with both the annular wall 70 and the valve disc 84. Then, if the brakes are applied more strongly or are slightly released, communication is reestablished in one direction or the other to increase or decrease the amount of vacuum in the controlled pressure chamber 76.

It will be observed that by using my novel device, the trailer brakes are applied in conformity with the application of the tractor brakes and without the use of a very large volume of hydraulic fluid. This system is particularly suitable for house trailers in view of the fact that the majority of modern passenger automobiles are equipped with hydraulic brakes, but I do not desire to limit myself to this application solely.

Figure 2:
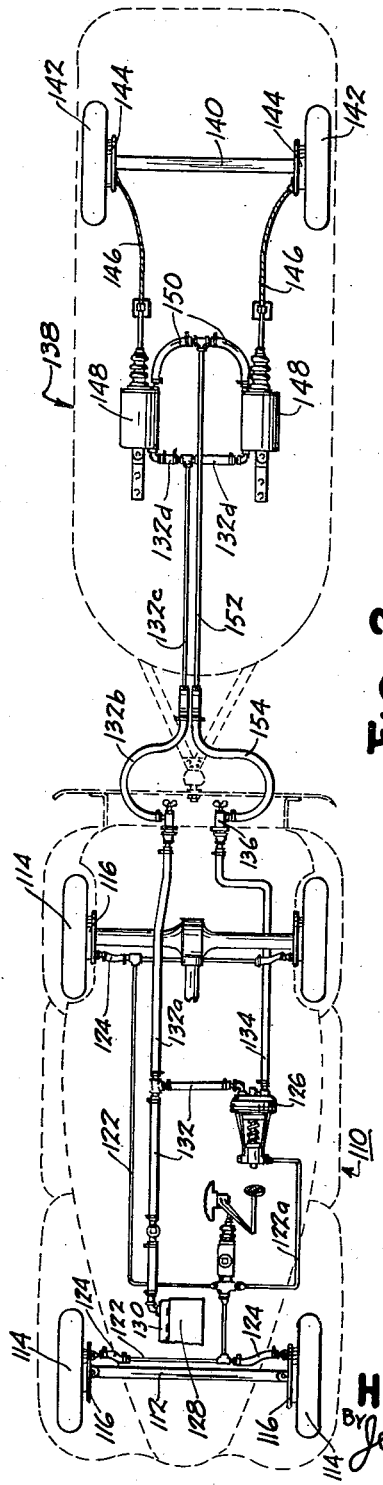
Figure 2 is a view similar to Figure 1 but in which the brakes of the trailer vehicle are actuated by vacuum-suspended cylinders.
Figure 4:
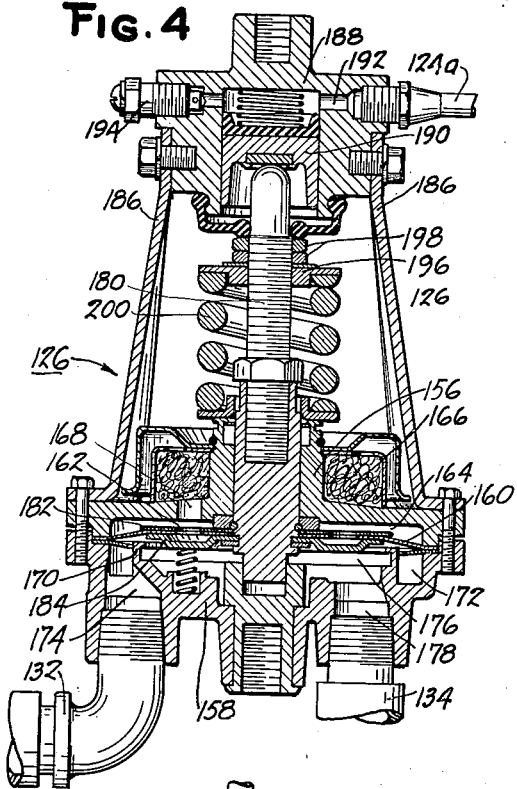
Figure 4 is a longitudinal sectional view of the valve of Figure 2.

In the arrangement of Figures 2 and 4 corresponding parts are designated by the same reference numerals plus 100. Referring to the valve 126 of Figure 4, the casing shells 156 and 158 are arranged in inverse positions to those of the valve 26 of Figure 1. With this valve the vacuum chamber 172 and the controlled pressure chamber 176 are normally in communication so that vacuum is transmitted through the conduit 134, the flexible hose 154 and the conduits 150 and 152. The conduits 150 are connected to the rear ends of the cylinders 148, and an extension of the vacuum line 132 comprising a conduit 132a, a flexible hose 132b, and conduits 132c and 132d are connected to the front ends of the cylinders 148. When the valve 126 is operated air is admitted to the controlled pressure chamber and transmitted through the lines to the rear of the cylinders 148 thereby applying the brakes. This system is called a vacuum-suspended system while that of Figure 1 is called an atmospheric-suspended system.

Figure 6:
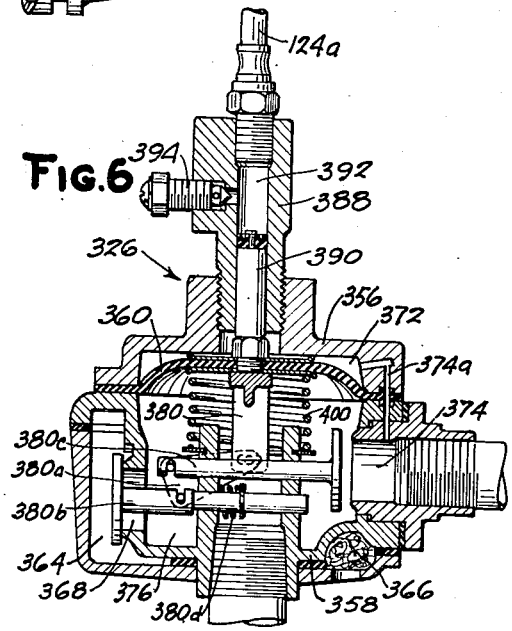
Figure 6 is a longitudinal sectional view of another type of valve suitable for use in the arrangement of Figure 2.
Figure 5:
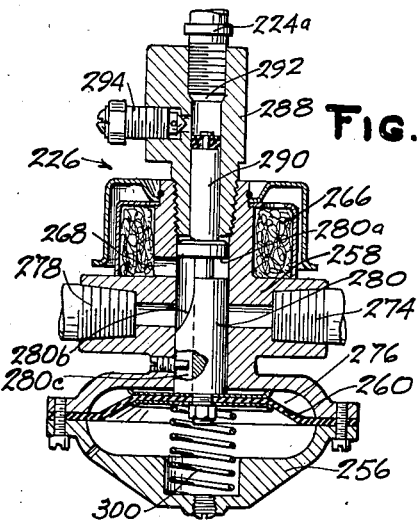
Figure 5 is a longitudinal sectional view of another type of valve suitable for use in the arrangement of Figure 1.

In Figure 5 I have shown a modified valve for the atmospheric-suspended system of Figure 1. In this figure parts corresponding to parts of Figure 1 are designated by the same reference numeral plus 200. In this valve the plunger 280 is provided with a reduced portion 280a, a cut-away portion 280b and a longitudinal groove 280c. With the plunger in its normal position air is transmitted through the air port 268 past the reduced and cut-away portions 280a and 280b of the plunger 280 to the controlled pressure port 278. When hydraulic pressure acts on the piston 290 the plunger 280 is moved downwardly so that the air port 268 is first cut off and then the vacuum port 274 is opened and put into communication with the controlled pressure port 278. The pressure in the controlled pressure port 278 is at all times transmitted through the slot 280c to the controlled pressure chamber 276 where it reacts upon the upper face of the diaphragm 260 to balance the force of the piston 290 in the same manner as described with relation to the valve 26. The valve of Figure 6 is a modification suitable for use in a vacuum-suspended system such as Figure 2. In this modification parts corresponding to parts of Figure 1 are designated by the same reference numerals plus 300.

In this modification the valve elements comprise a plunger 380 secured to the diaphragm 360, a floating lever 380a engaged by the plunger and engaging a pair of poppet valves 380b and 380c respectively adapted to close the air ports 368 and the vacuum port 374. A biasing spring 380d on the stem of the valve 380b insures that one valve closes before the other opens and vice versa. The plunger 380 is normally urged upwardly by the spring 400 in which position the valve 380c is lifted admitting vacuum from the port 374 to the controlled pressure chamber 376. When the valve is operated by forcing the plunger downwardly, valve 380c first closes, cutting off the vacuum, and then valve 380b opens, admitting air to the controlled pressure chamber. Vacuum is normally present in the chamber 372 on the upper side of the diaphragm, a port 374a being provided for this purpose. When air is admitted to the controlled pressure chamber 376 it reacts against the diaphragm 360 in opposition to the force of the piston 390 thereby providing proportionate braking on the trailer as previously described.

While I have described several embodiments of my invention, it is not my intention to be limited to those embodiments or otherwise than by the terms of the appended claims.

I claim:

1. In combination, a tractor, a trailer, brakes on each, hydraulic pressure creating means for actuating the tractor brakes, differential air pressure operating means for the trailer brakes, a source of differential air pressure, a valve for controlling said differential air pressure, hydraulic pressure actuating means on said valve, connections between the hydraulic pressure creating means and the hydraulic pressure actuating means, and connections between said valve and said source of differential air pressure and between said valve and said differential air pressure operating means.

2. In combination, a tractor, a trailer, brakes on each, hydraulic pressure creating means for actuating the tractor brakes, differential air pressure operating means for the trailer brakes, a source of differential air pressure, a valve for controlling said differential air pressure, hydraulic pressure actuating means on said valve, connections between the hydraulic pressure creating means and the hydraulic pressure actuating means, and connections between said valve and said source of differential air pressure and between said valve and said differential air pressure operating means, said valve having a pressure responsive element reacting against said hydraulic pressure actuating means.

3. In combination, a tractor, a trailer, brakes on each, hydraulic pressure creating means for actuating the tractor brakes, differential air pressure operating means for the trailer brakes, a source of differential air pressure, a valve for controlling said differential air pressure, hydraulic pressure actuating means on said valve, connections between the hydraulic pressure creating means and the hydraulic pressure actuating means, and connections between said valve and said source of differential air pressure and between said valve and said differential air pressure operating means, said valve having a spring and a pressure responsive element reacting against said hydraulic pressure actuating means.

4. A combination braking system for vehicles comprising hydraulic brakes and differential air pressure operated brakes, a source of differential air pressure, connections between said source and said differential air pressure operated brakes, a control valve in said connections, and means in said valve responsive to the pressure in the hydraulic brakes for actuating said valve.

5. A combination braking system for vehicles comprising hydraulic brakes and differential air pressure operated brakes, a source of differential air pressure, connections between said source and said differential air pressure operated brakes, a control valve in said connections, means in said valve responsive to the pressure in the hydraulic brakes for actuating said valve, and means in said valve responsive to the differential air pressure opposed to said first named means.

6. A combination braking system for vehicles comprising hydraulic brakes and differential air pressure operated brakes, a source of differential air pressure, connections between said source and said differential air pressure operated brakes, a control valve in said connections, means in said valve responsive to the pressure in the hydraulic brakes for actuating said valve, and a spring opposed to said first named means.

7. A combination braking system for vehicles comprising hydraulic brakes and differential air pressure operated brakes, a source of differential air pressure, connections between said source and said differential air pressure operated brakes, a control valve in said connections, means in said valve responsive to the pressure in the hydraulic brakes for actuating said valve, a spring opposed to said first named means, and means for adjusting the force exerted by said spring.

8. In combination, a tractor, a trailer, brakes on each, hydraulic pressure creating means for actuating the tractor brakes, vacuum cylinders for operating the trailer brakes, a source of vacuum, a valve for controlling the vacuum, hydraulic pressure actuating means on said valve, connections between the hydraulic pressure creating means and the hydraulic pressure actuating means, and connections between said valve and said source of vacuum and between said valve and said vacuum cylinders.

9. In combination, a tractor, a trailer, brakes on each, hydraulic pressure creating means for actuating the tractor brakes, vacuum cylinders for operating the trailer brakes, a source of vacuum, a valve for controlling the vacuum, hydraulic pressure actuating means on said valve, connections between the hydraulic pressure creating means and the hydraulic pressure actuating means, and connections between said valve and said source of vacuum and between said valve and said vacuum cylinders, said vacuum cylinders being of the atmospheric-suspended type.

10. In combination, a tractor, a trailer, brakes on each, hydraulic pressure creating means for actuating the tractor brakes, vacuum cylinders for operating the trailer brakes, a source of vacuum, a valve for controlling the vacuum, hydraulic pressure actuating means on said valve, connections between the hydraulic pressure creating means and the hydraulic pressure actuating means, and connections between said valve and said source of vacuum and between said valve and said vacuum cylinders, said vacuum cylinders being of the vacuum-suspended type.

11. In combination, a tractor, a trailer, brakes on each, hydraulic pressure creating means for actuating the tractor brakes, vacuum cylinders for operating the trailer brakes, a source of vacuum, a valve for controlling the vacuum, hydraulic pressure actuating means on said valve, connections between the hydraulic pressure creating means and the hydraulic pressure actuating means, and connections between said valve and said source of vacuum and between said valve and said vacuum cylinders, said vacuum cylinders being of the atmospheric-suspended type, and said valve having a vacuum responsive element opposed to said hydraulic pressure actuating means.

12. In combination, a tractor, a trailer, brakes on each, hydraulic pressure creating means for actuating the tractor brakes, vacuum cylinders for operating the trailer brakes, a source of vacuum, a valve for controlling the vacuum, hydraulic pressure actuating means on said valve, connections between the hydraulic pressure creating means and the hydraulic pressure actuating means, and connections between said valve and said source of vacuum and between said valve and said vacuum cylinders, said vacuum cylinders being of the vacuum-suspended type, and said valve having an air pressure responsive element opposed to said hydraulic pressure actuating means.

13. A combination braking system comprising hydraulically operated brakes and pneumatically operated brakes, a hydraulically operated element operated by pressure on the hydraulically operated brakes, valve elements moved by said hydraulically actuated element for controlling the admission of different air pressures to a controlled pressure chamber to operate the pneumatically operated brakes, and an air pressure responsive element in said chamber constructed and arranged to oppose the force of the hydraulically actuated element and increase the reaction force of the hydraulically operated brakes.

HENRY BAADE.